(12) United States Patent
Saa-Garriga et al.

(10) Patent No.: US 12,417,067 B2
(45) Date of Patent: Sep. 16, 2025

(54) IMAGE PROCESSING

(71) Applicant: SAMSUNG ELECTRONICS CO., LTD., Suwon-si (KR)

(72) Inventors: Albert Saa-Garriga, Staines (GB); Daniel Valdez-Balderas, Staines (GB); Prashant Sharma, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

(21) Appl. No.: 17/963,722

(22) Filed: Oct. 11, 2022

(65) Prior Publication Data
US 2023/0036950 A1 Feb. 2, 2023

Related U.S. Application Data

(63) Continuation of application No. PCT/KR2021/004217, filed on Apr. 5, 2021.

(30) Foreign Application Priority Data

Apr. 9, 2020 (GB) ...................................... 2005277
Aug. 26, 2020 (GB) ...................................... 2013332

(51) Int. Cl.
*G06F 3/14* (2006.01)
*G06F 3/147* (2006.01)
(Continued)

(52) U.S. Cl.
CPC ............ *G06F 3/147* (2013.01); *G06F 3/1415* (2013.01); *G06T 3/04* (2024.01); *G06T 3/40* (2013.01);
(Continued)

(58) Field of Classification Search
CPC .......... G06T 3/04; G06T 3/40; G06T 2210/22
(Continued)

(56) References Cited

U.S. PATENT DOCUMENTS 8,218,895 B1 7/2012 Gleicher et al.
8,861,864 B2 * 10/2014 Hong ................... G06V 10/462
382/218

(Continued)

OTHER PUBLICATIONS

Search Report (PCT/ISA/220, PCT/ISA/210) issued Jul. 28, 2021 by the International Searching Authority for International Patent Application No. PCT/KR2021/004217.
(Continued)

*Primary Examiner* — Samantha (Yuehan) Wang
(74) *Attorney, Agent, or Firm* — Sughrue Mion, PLLC

(57) ABSTRACT

A method and system for processing an image is described. For example, the method comprises detecting a plurality of objects within an in input image; identifying dimensions of a display on which the input image is to be displayed; cropping the input image to obtain a cropped image which matches the identified dimensions, wherein the cropped image includes at least one of the plurality of detected objects; obtaining a list of missing objects which are not visible in the cropped image and which were detected in the input image; outputting a representation of each missing object in the list of missing objects to be displayed together with the cropped image; generating an updated image comprising the representation of at least one missing object and which matches the identified dimensions; and outputting the updated image to be displayed on the display.

14 Claims, 16 Drawing Sheets

(51) Int. Cl.

| | |
|---|---|
| *G06T 3/04* | (2024.01) |
| *G06T 3/40* | (2006.01) |
| *G06T 11/60* | (2006.01) |
| *G06V 10/22* | (2022.01) |
| *G06V 20/00* | (2022.01) |

(52) U.S. Cl.
CPC ............ *G06T 11/60* (2013.01); *G06V 10/235* (2022.01); *G06V 20/00* (2022.01); *G06T 2210/22* (2013.01)

(58) Field of Classification Search
USPC ........................................................ 345/625
See application file for complete search history.

(56) References Cited

U.S. PATENT DOCUMENTS

| | | | |
|---|---|---|---|
| 2006/0139371 A1 | 6/2006 | Lavine et al. | |
| 2011/0096228 A1 | 4/2011 | Deigmoeller et al. | |
| 2014/0270533 A1 | 9/2014 | Chedeau | |
| 2014/0280180 A1* | 9/2014 | Edecker | G06F 16/285 707/769 |
| 2016/0203585 A1 | 7/2016 | Welinder et al. | |
| 2016/0269645 A1 | 9/2016 | Khoe et al. | |
| 2017/0243356 A1 | 8/2017 | Eckert | |
| 2018/0032238 A1* | 2/2018 | Jung | G06F 16/54 |
| 2019/0370546 A1 | 12/2019 | Agarwal et al. | |
| 2022/0245823 A1* | 8/2022 | Su | G06T 7/11 |

OTHER PUBLICATIONS

Written Opinion (PCT/ISA/237) issued Jul. 28, 2021 by the International Searching Authority for International Patent Application No. PCT/KR2021/004217.

Communication issued Feb. 19, 2021 by the Intellectual Property Office of Great Britain for British Patent Application No. GB 2013332.8.

He, et al., "Mask R-CNN" 2018, 12 pages total, arXiv:1703.06870v3 [cs.CV].

Redmond, et al., "YOLOv3: An Incremental Improvement", 2018, 6 pages total.

Boyla, et al., "YOLACT++ Better Real-time Instance Segmentation", 2019, 12 pages total, arXiv:1912.06218v1 [cs.CV].

Lu, et al., "An End-to-End Neural Network for Image Cropping by Learning Composition from Aesthetic Photos", 2019, 13 pages total, arXiv:1907.01432v3 [cs.CV].

Li, et al., "A2-RL: Aesthetics Aware Reinforcement Learning for Image Cropping", 2018, 9 pages total.

Zeng et al., "Reliable and Efficient Image Cropping: A Grid Anchor based Approach", 2019, 9 pages total, arXiv:1904.04441v1 [cs.CV].

Cornia, et al., "Meshed-Memory Transformer for Image Captioning", 2020, 15 pages total, arXiv:1912.08226v2 [cs.CV].

Yang, et al., "Image Captioning with Object Detection and Localization", 2017, 10 pages total.

Tan, et al., "Cycle-IR: Deep Cyclic Image Retargeting", 2019, 12 pages total, arXiv:1905.03556v1 [cs.CV].

Lin et al., "DeepIR: A Deep Semantics Driven Framework for Image Retargeting", 2019, 9 pages total, arXiv:1811.07793v3 [cs.CV].

Tang, et al., "Image Retargetability", 2019, IEEE Transactions on Multimedia, vol. XX, Issue XX, 13 pages total, arXiv:1802.04392v2 [cs.CV].

Kim et al., "Deep Video Inpainting", 2019, 10 pages total, arXiv:1905.01639v1 [cs.CV].

"Distribution of Instagram users worldwide as of Apr. 2022, by age group" 2022, 1 page total, statista.com https://www.statista.com/statistics/325587/instagram-global-age-group/.

Chen, et al., "Automatic Image Cropping : A Computational Complexity Study", 2016, 9 pages total.

* cited by examiner

[Figure 1]
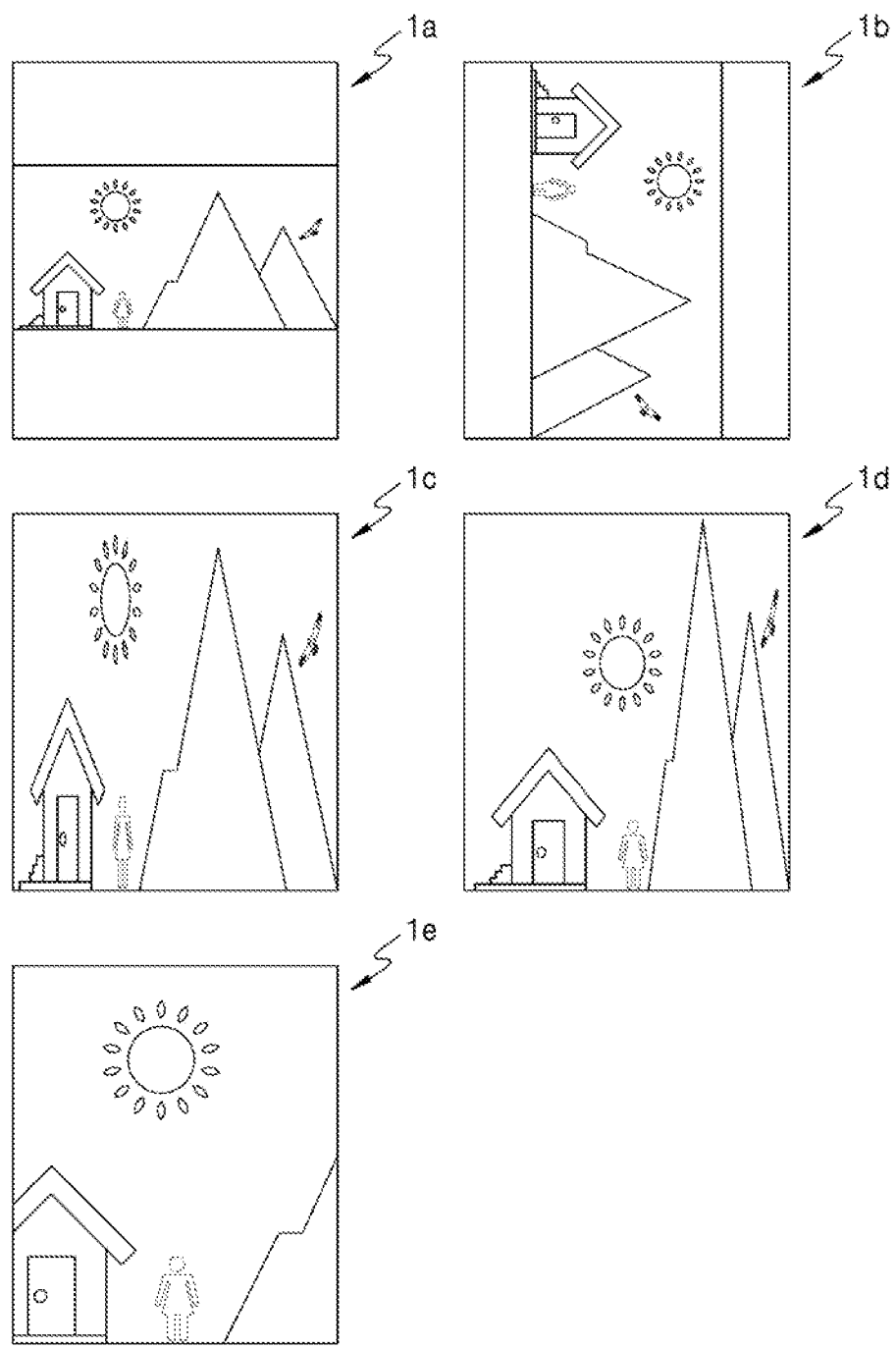

[Figure 2]
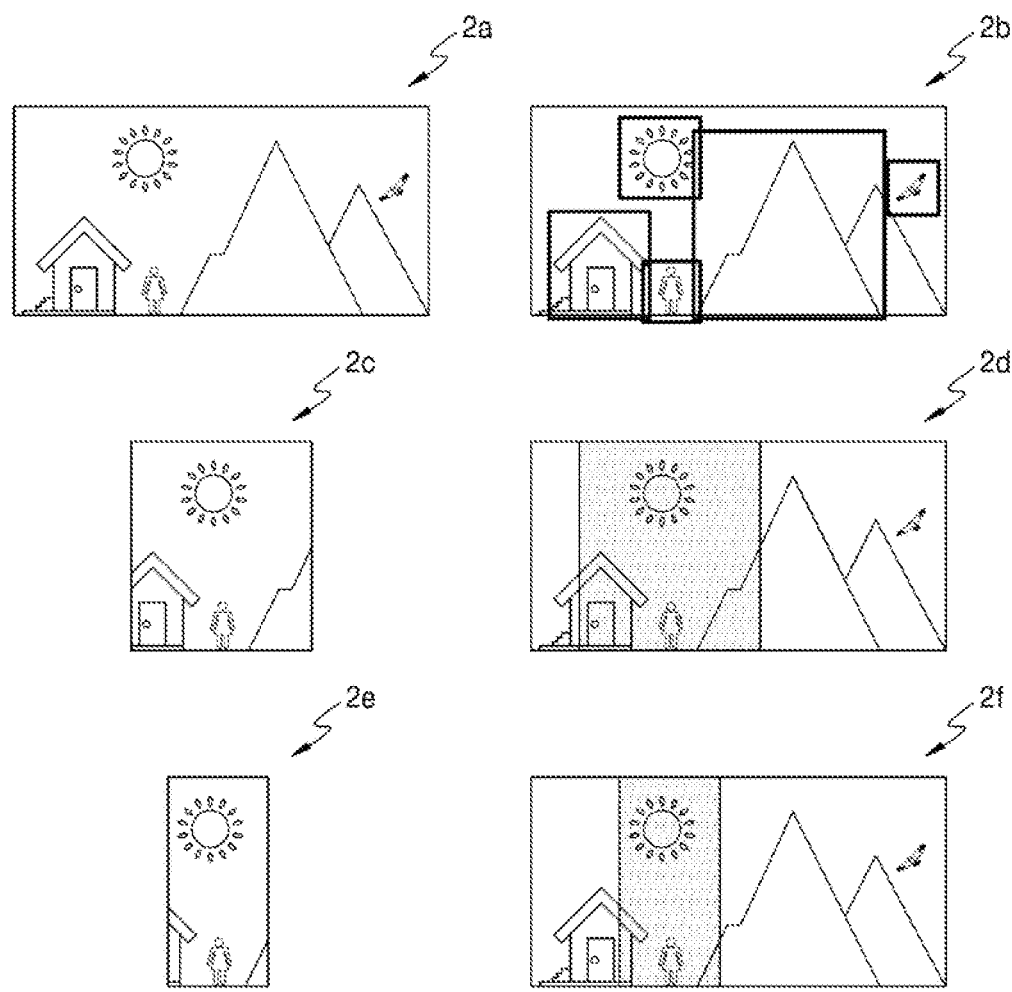

[Figure 3a]
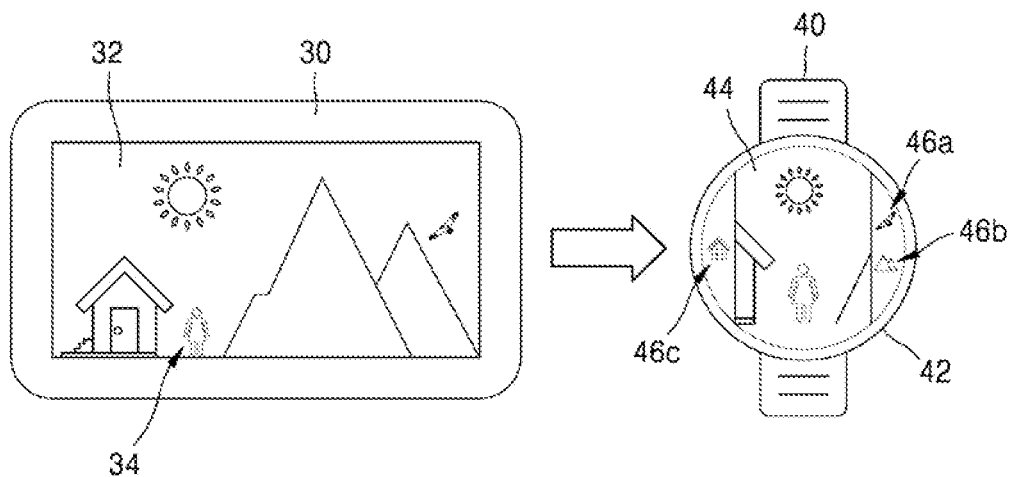
[Figure 3b]
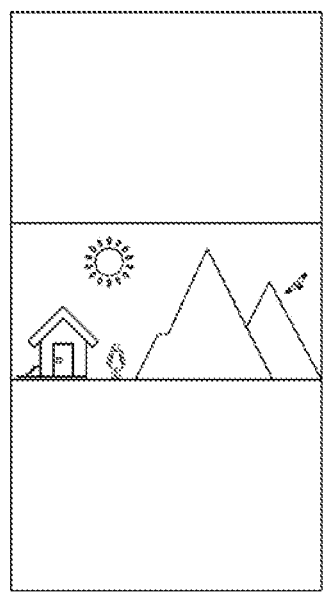

[Figure 3c]
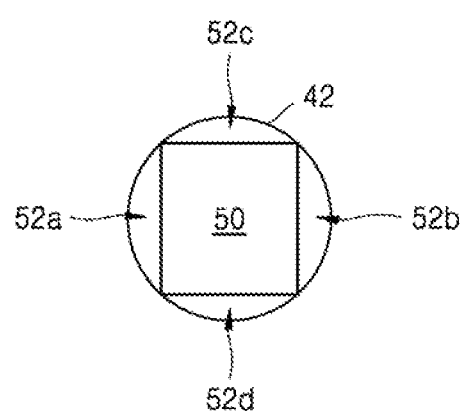

【Figure 4】
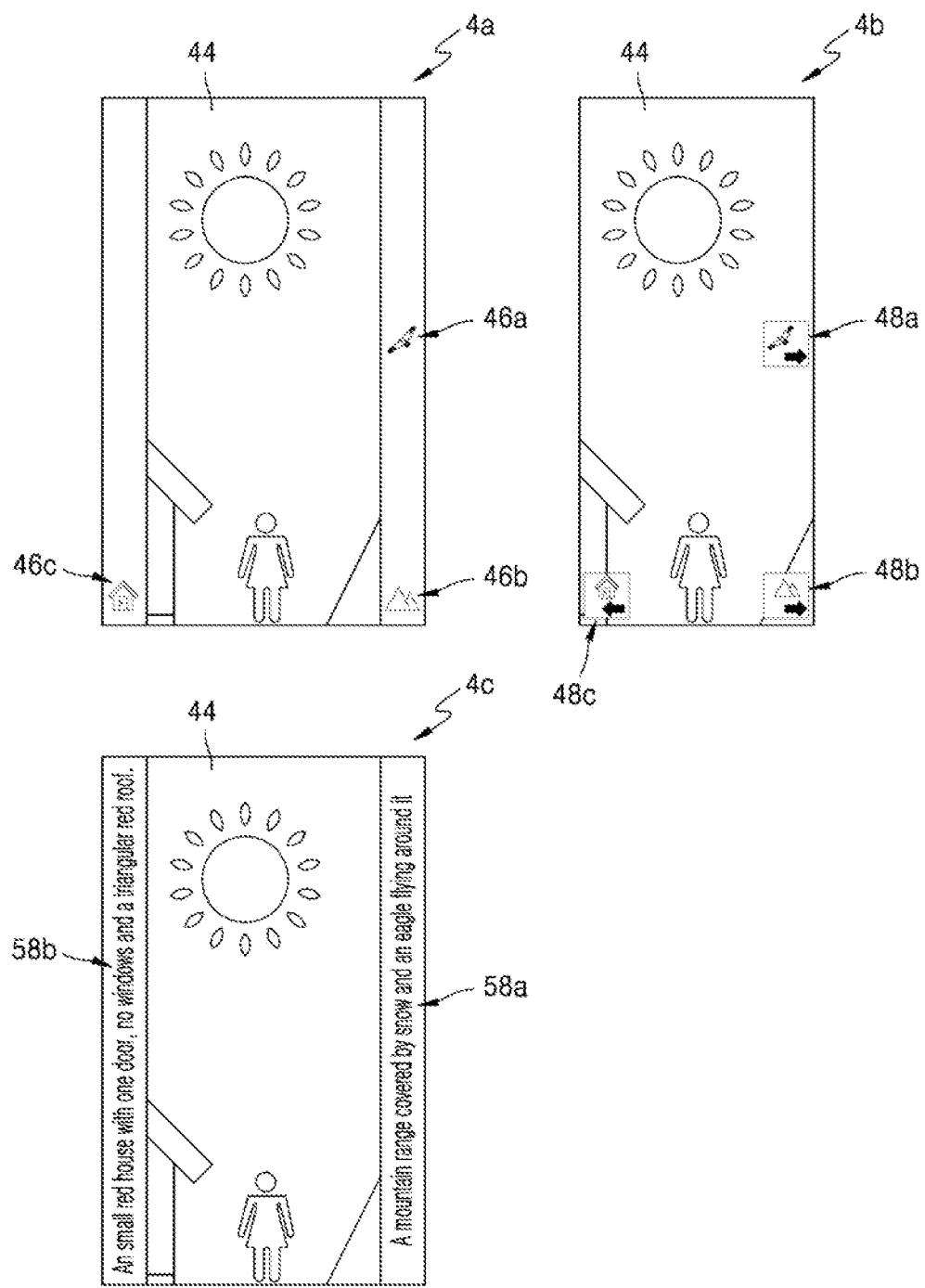

[Figure 5]
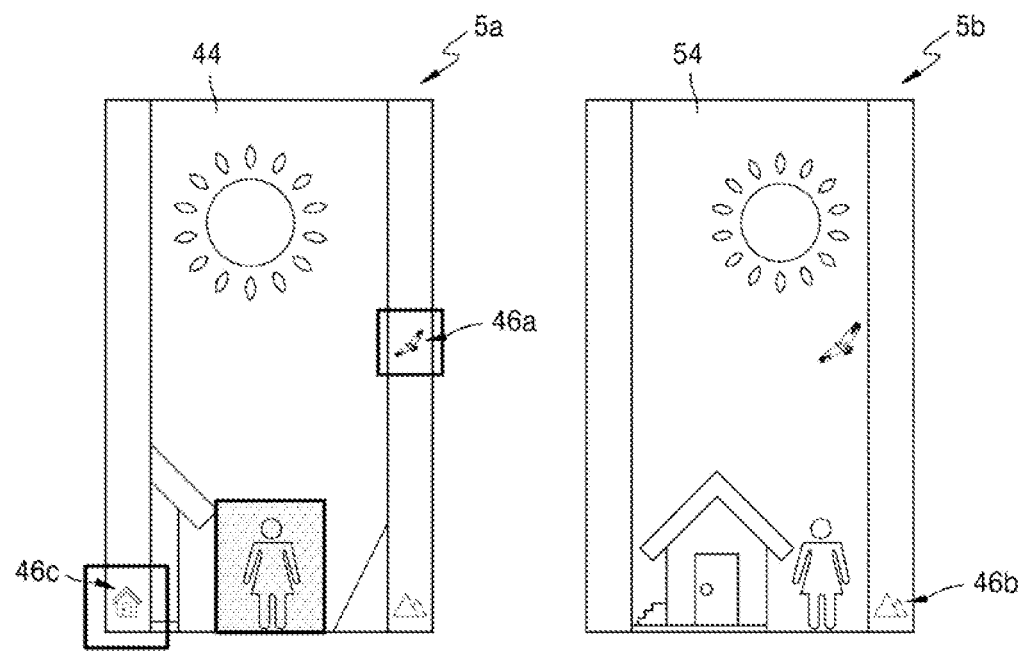

[Figure 6]
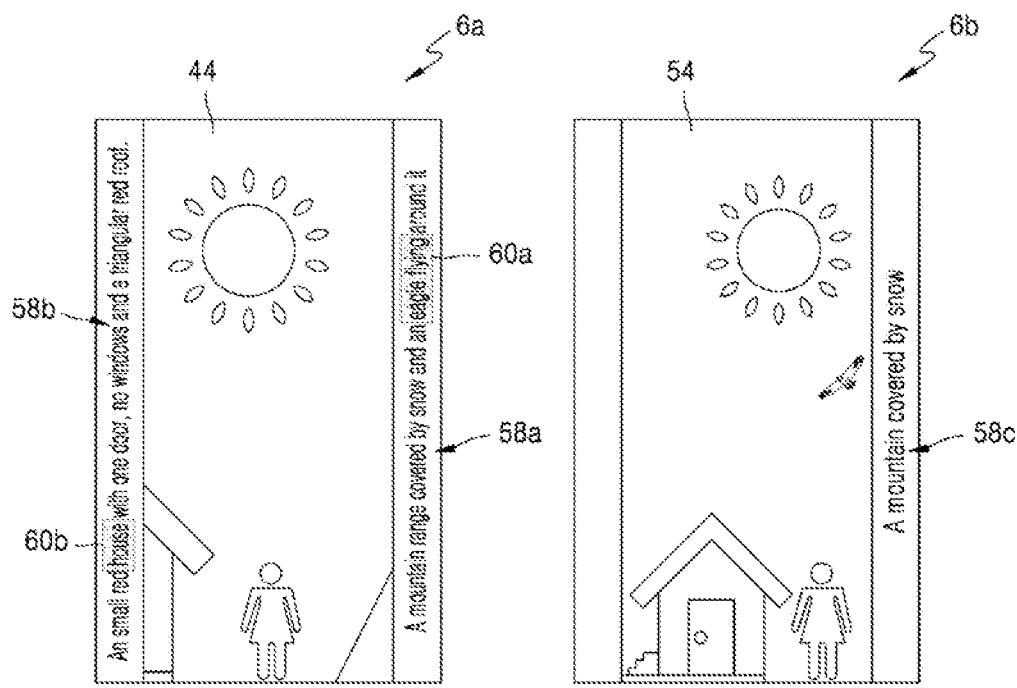

[Figure 7]
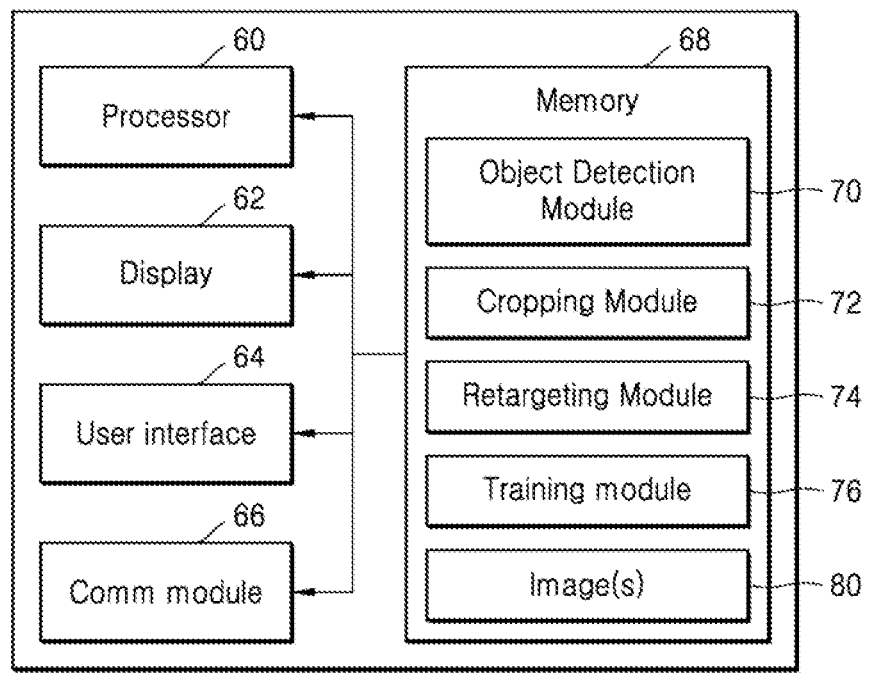

[Figure 8a]
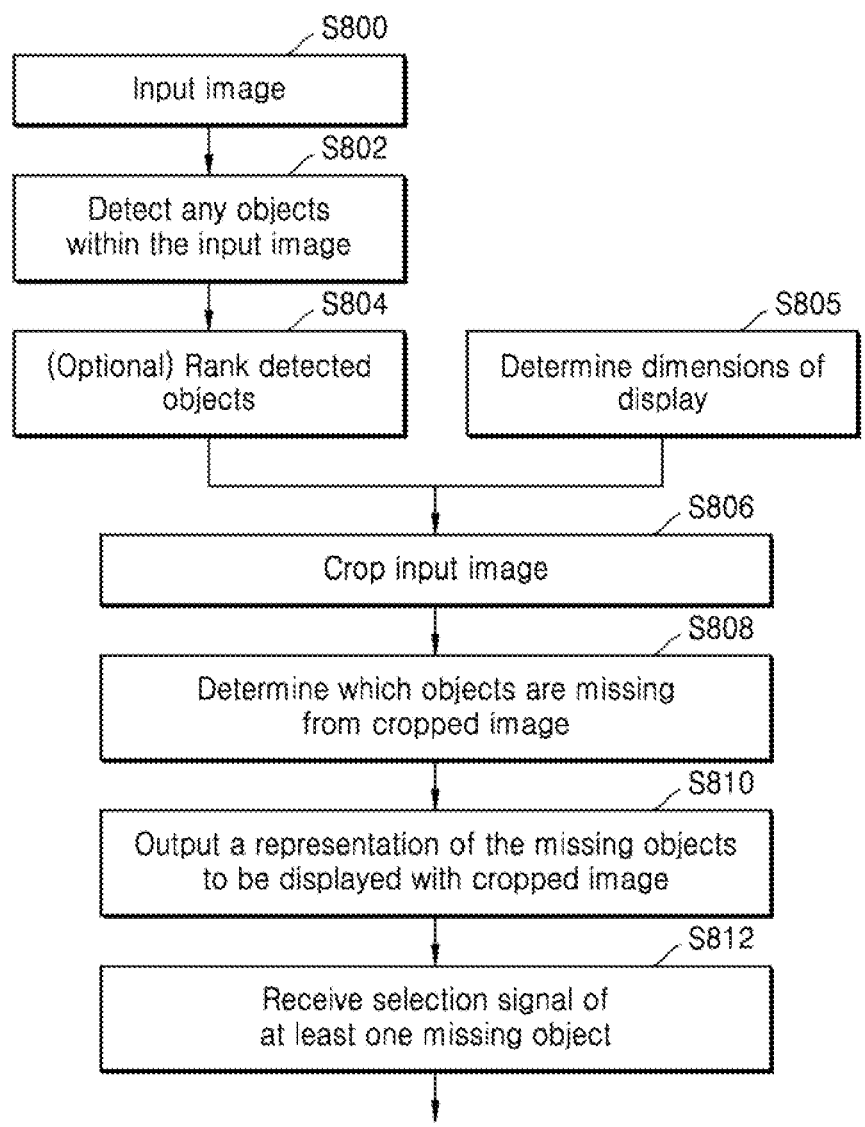

[Figure 8b]
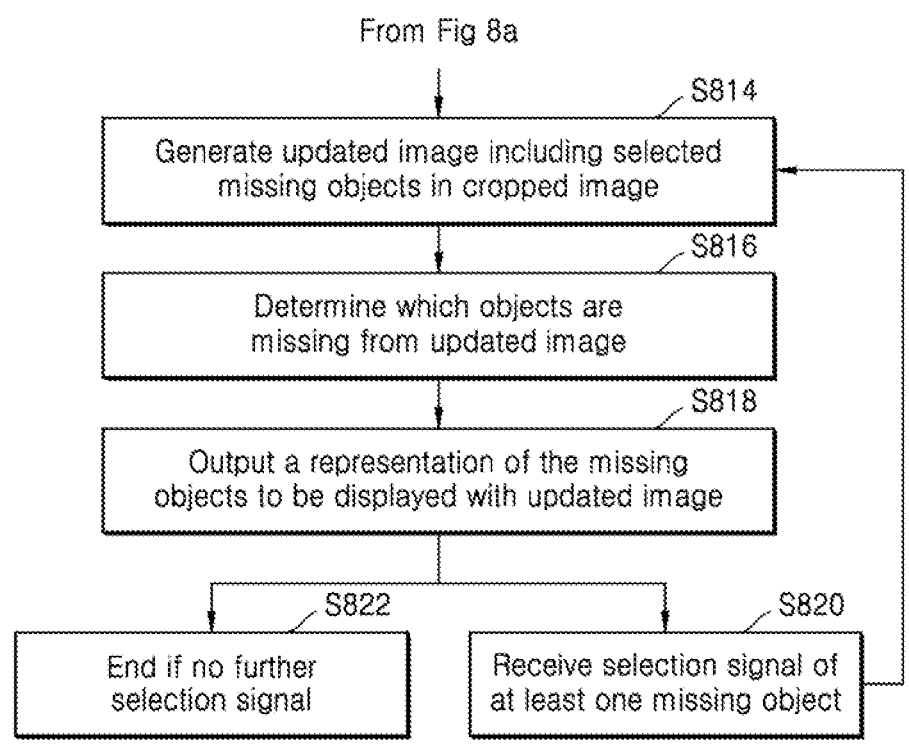

【Figure 9】
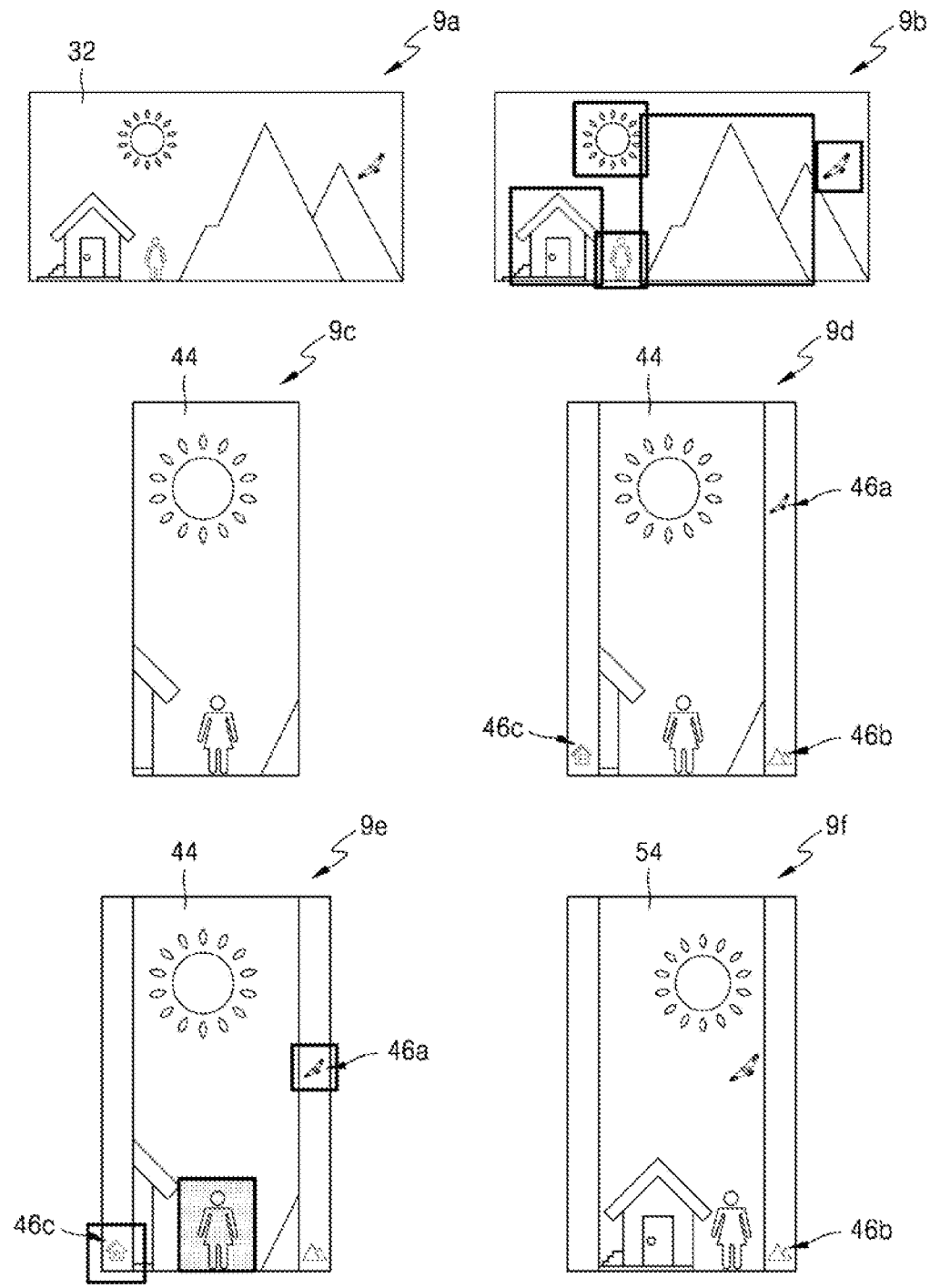

【Figure 10a】
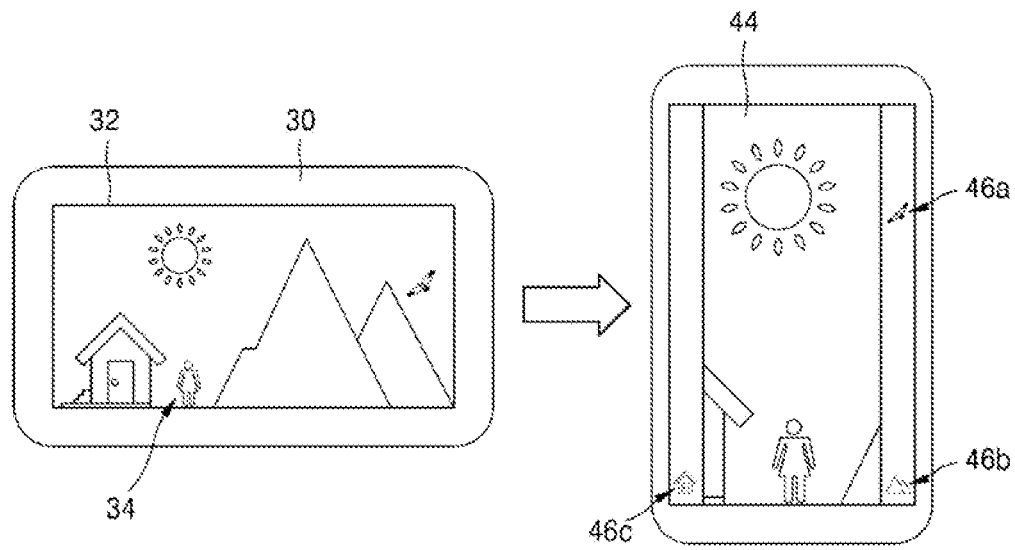
【Figure 10b】
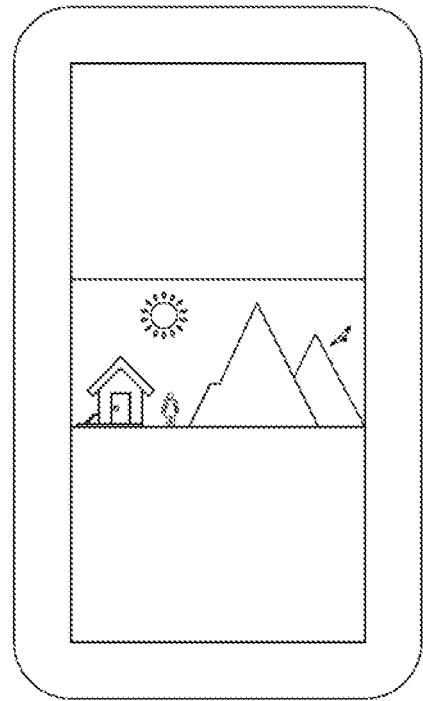

【Figure 10c】
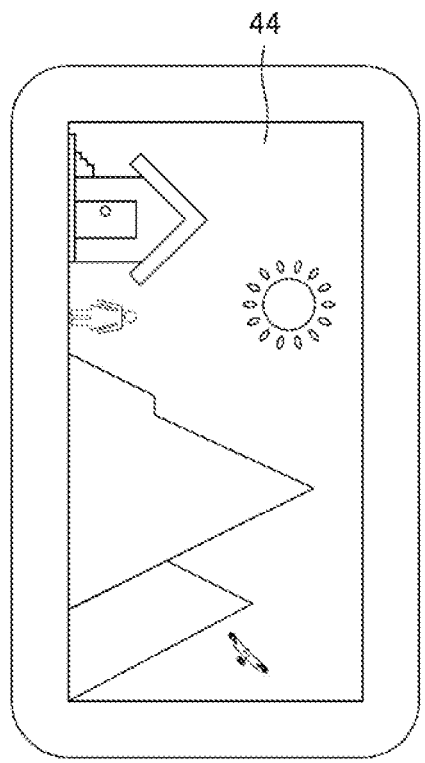
【Figure 11a】
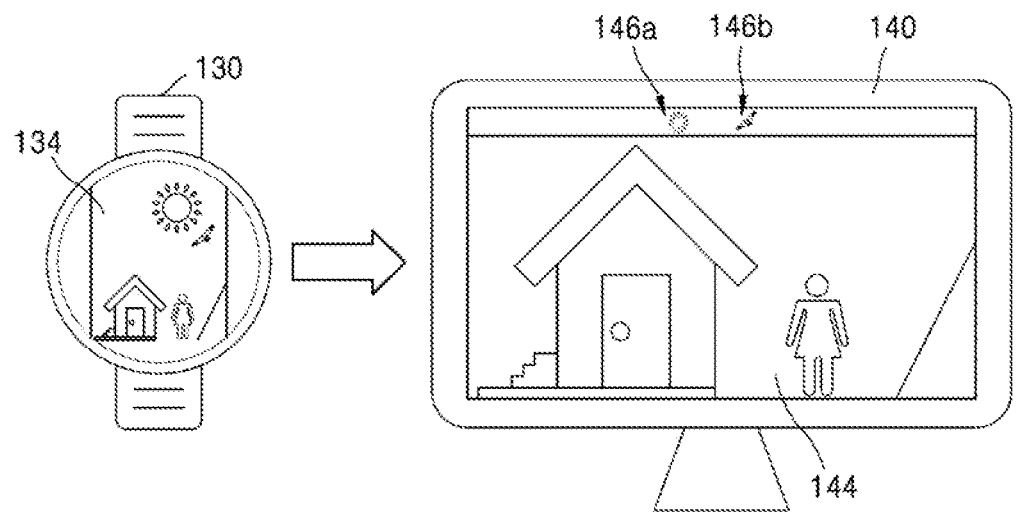

[Figure 11b]
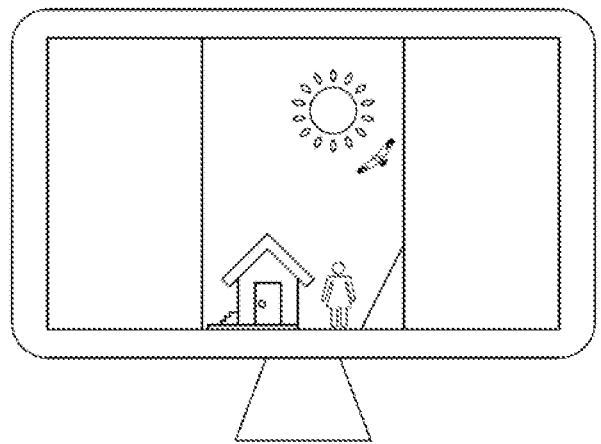
[Figure 12a]
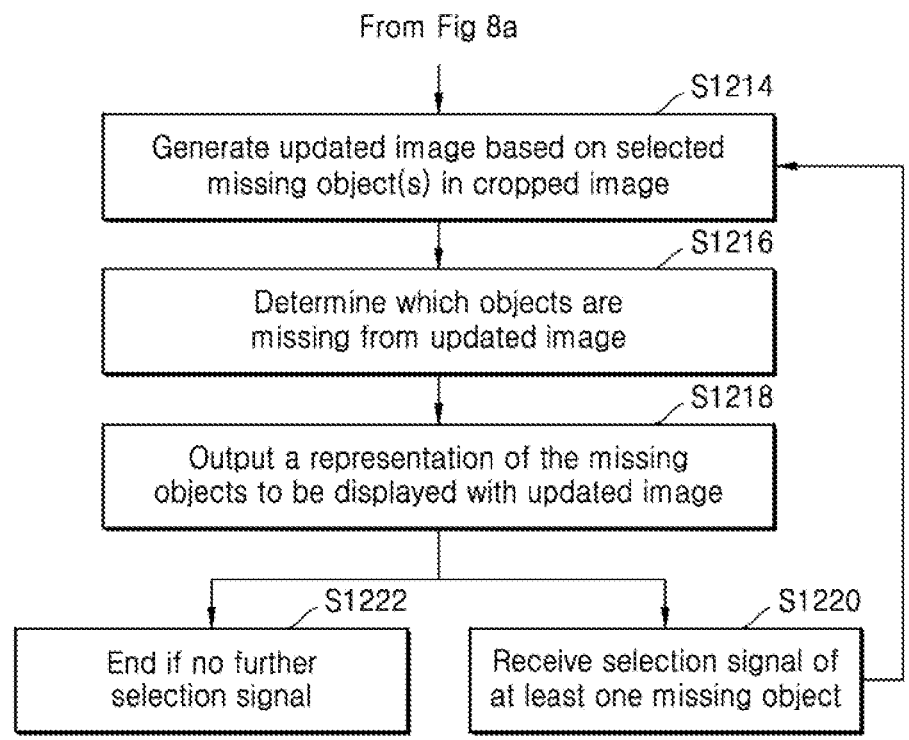

【Figure 12b】
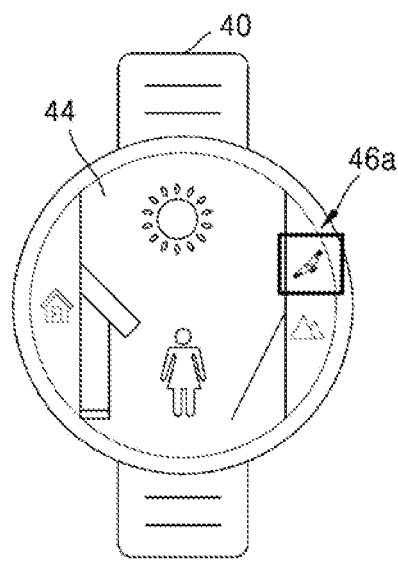
【Figure 12c】
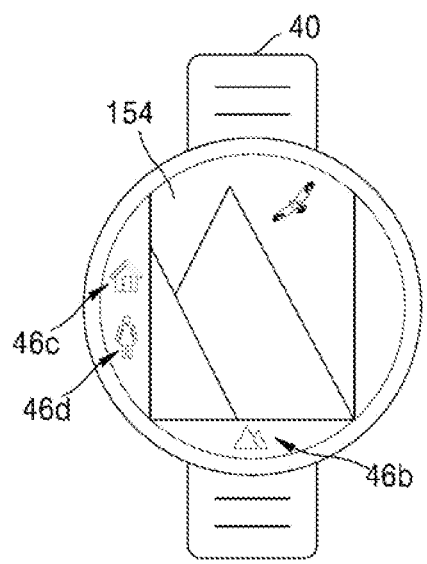

[Figure 13]
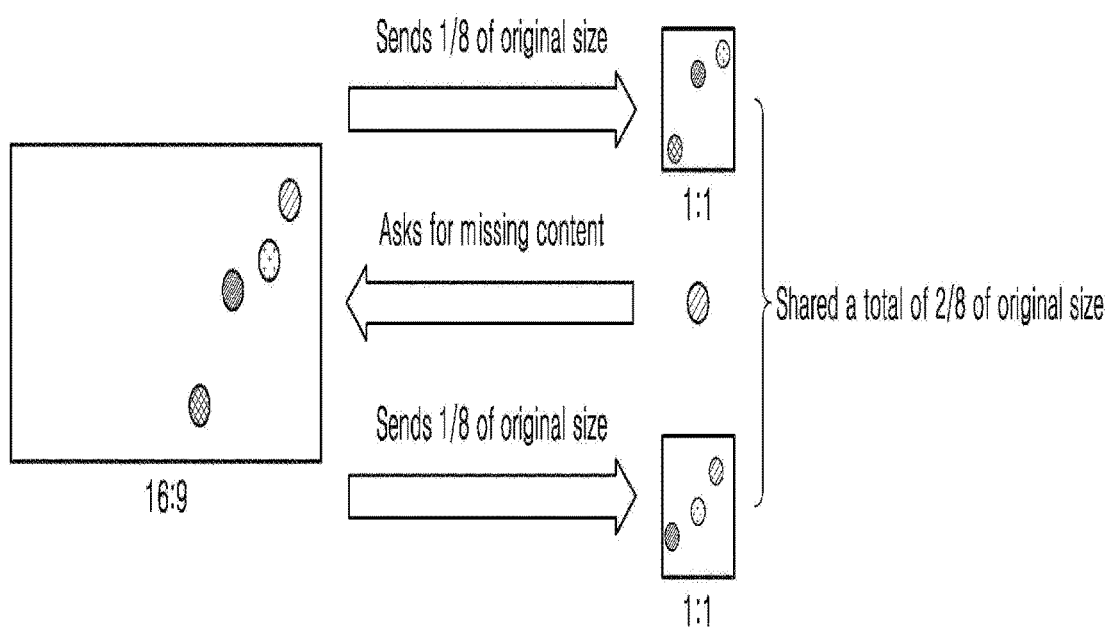

IMAGE PROCESSING

TECHNICAL FIELD

This disclosure relates generally to image processing systems. More specifically, this disclosure relates to improvements in and relating to image processing on devices with various size of display screen.

BACKGROUND ART

Images are often transferred from one user device to another user device which may have a different display size. The different display size may mean that information within the image is not displayed and/or the content may be distorted. For example, an image on a smart phone may be transferred to a smart watch having a smaller display screen.

DISCLOSURE

Technical Problem

This disclosure provides improvements in and relating to image processing on devices with various size of display screen.

Technical Solution

According to a first aspect of the present invention there is provided an image processing method comprising: detecting a plurality of objects within an input image; identifying dimensions of a display on which the input image is to be displayed; cropping the input image to obtain a cropped image which matches the identified dimensions, wherein the cropped image includes at least one of the plurality of detected objects; obtaining a list of missing objects which are not visible in the cropped image and which were detected in the input image; outputting a representation of each missing object in the list of missing objects to be displayed together with the cropped image; generating an updated image which comprises the representation of at least one missing object and which matches the identified dimensions; and outputting the updated image to be displayed on the display.

According to another aspect of the invention, there is also provided an electronic device comprising: memory storing computer readable program code, and a processor which executes the stored computer readable program code to carry out the image processing method described above. For example, the electronic device may comprise an object detection module for detecting a plurality of objects within the input image. The electronic device may comprise a cropping module for cropping the input image and/or generating an updated image when cropping is used. The electronic device may comprise a retargeting module for generating the updated image when a retargeting algorithm is used. The electronic device may comprise a training module for training using historic selection signals of the missing objects and/or selection of device for display. The modules may enable the processor to process an image as described above.

According to another aspect of the invention, there is also provided a system comprising a first electronic device described above, and a second electronic device which is connected to the first electronic device and which has a display on which the cropped image and representation of the at least one missing object are displayed. In other words, the system may comprise a first device and a second device, wherein the first device comprises a processor which is configured to detect a plurality of objects within an input image; identify dimensions of a display on the second device on which the input image is to be displayed; crop the input image to obtain a cropped image which matches the identified dimensions, wherein the cropped image includes at least one of the plurality of detected objects; obtain a list of missing objects which are not visible in the cropped image and which were detected in the input image; output, to the second device, a representation of each missing object in the list of missing objects to be displayed together with the cropped image; receive, from the second user device, a selection signal of at least one missing object; generate an updated image which comprises the selected at least one missing object and which matches the identified dimensions; and output, to the second user device, the updated image to be displayed on the display. The second user device comprises a processor which is configured to display the representation of each missing object and the cropped image received from the first user device; obtain a selection signal of at least one missing object; send the selection signal to the first user device; and display the updated image (and optionally any representations of missing objects).

DESCRIPTION OF DRAWINGS

For a better understanding of the invention, and to show how embodiments of the same may be carried into effect, reference will now be made, by way of example only, to the accompanying diagrammatic drawings in which:

FIG. 1 illustrates methods for resizing an image to fit a display screen;

FIG. 2 illustrates in more detail a method for cropping an image as shown in FIG. 1;

FIG. 3a illustrates an example system according to an embodiment of the invention;

FIG. 3b illustrates an alternative way of displaying an image on the second user device of FIG. 3a;

FIG. 3c is a schematic illustration of the second user device of FIG. 3a;

FIG. 4 illustrates different ways of displaying missing contents alongside a cropped image.

FIG. 5 illustrates user interaction with the representations of missing content of FIG. 4;

FIG. 6 illustrates user interaction with the representations of missing content of FIG. 4;

FIG. 7 is a schematic block diagram of the components within at least one of the user device of the system of FIG. 3a.

FIGS. 8a and 8b together form a flowchart illustrating the steps of the method which may be implemented in the system of FIG. 3a and by the device shown in FIG. 7;

FIG. 9 illustrates outputs after some of the steps in the method shown in FIGS. 8a to 8b;

FIG. 10a illustrates an alternative system to the one shown in FIG. 3a;

FIGS. 10b and 10c illustrate alternative ways an image could be shown in the system of FIG. 10a without using the method of FIGS. 8a and 8b;

FIG. 11a illustrates an alternative system to the one shown in FIG. 3a;

FIG. 11b illustrates an alternative way an image could be shown in the system of FIG. 11a without using the method of FIGS. 8a and 8b;

FIG. 12a is an alternative continuation of the method shown in FIG. 8a; and

FIGS. 12b and 12c illustrate outputs using the method of FIGS. 8a and 12a;

FIG. 13 illustrates an example image transfer system with two devices of different size of display screen.

MODE FOR INVENTION

FIG. 1 illustrates different methods for altering the original image to fit a different screen size. For example, referring to 1a and 1b, a commonly used method of adjustment is used. The original image is centred within the display and the image is rescaled but the aspect ratio of the original image is maintained. The image may also be rotated and two orientations are shown; an unrotated original image in 1a and a 90 degree rotated orientation in 1b. An advantage is that there is minimal computation involved in the adjustment process but a disadvantage is that the screen is not fully used.

Referring to 1c, the image is rescaled and in 1d, the image is retargeted. Scaling involves changing image dimensions via pixel value interpolation and retargeting intelligently manipulates content to change the aspect ratio. In both of these cases, the proportions of the input image is modified and in the case shown in 1d, the deformations are worse because the deformations are local. An advantage of scaling is that it may work well if the width and height are changed by the same factor but a disadvantage is that it will deform the image if the width and height are changed by different factors. Advantages of retargeting include preserving important details, reducing artifact and distortions and being aesthetically aware. Disadvantages of retargeting include more computing time and thus it is slower than cropping or scaling.

Referring to 1e, the image is cropped, i.e. a portion of the original image which fits the new display size is selected from the original image. There is no further modification to the image. Thus, like adjustment, an advantage is that there is minimal computation. However, a disadvantage is that important information may be left out of the new display.

Cropping may be based on content within the original image, for example as described in "Automatic Image Cropping: A Computational Complexity Study" by Chen et al. FIG. 2 illustrates in more detail a cropping method using content within an image for displaying an image for a smaller display size. Portion 2a shows the original image. As indicated in 2b, all the objects within the original image of 2a are highlighted. One of the objects within the image is selected as a focal point, in this example the person. Portion 2c shows the original image cropped to fit the dimensions of a generally square display whilst focusing on the selected object. The rest of the image is thus omitted as illustrated in 2d and is not available to the user. Similarly, portion 2e shows the original image cropped to fit the dimensions of a small rectangular display (e.g. for a smart watch) whilst focusing on the selected object. In this case, different parts of the rest of the image are omitted as illustrated in 2f.

According to a first aspect of the present invention there is provided an image processing method comprising: detecting a plurality of objects within an input image; identifying dimensions of a display on which the input image is to be displayed; cropping the input image to obtain a cropped image which matches the identified dimensions, wherein the cropped image includes at least one of the plurality of detected objects; obtaining a list of missing objects which are not visible in the cropped image and which were detected in the input image; outputting a representation of each missing object in the list of missing objects to be displayed together with the cropped image; receiving a selection signal of at least one missing object; generating an updated image which comprises the selected at least one missing object and which matches the identified dimensions; and outputting the updated image to be displayed on the display.

The cropped image and updated image fit the display and may have the same resolution as the original image. These images may be output to be displayed in a main portion of the display, and the main portion may be a point of view for a user. The objects which are omitted from the output cropped image are also displayed so that the user does not lose any of the detail of the original input image.

After outputting the updated image, the image processing method may further comprise obtaining a list of missing objects which are not visible in the updated image and which were detected in the input image and outputting a representation of each missing object in the list of missing objects to be displayed together with the updated image. Similarly, the method may further comprise receiving a selection signal of at least one missing object and generating a further updated image which comprises the selected at least one missing object and which matches the identified dimensions. These obtaining, outputting, receiving and generating steps may be repeated until the selection signal is no longer received.

The representation of each missing object may be selected from an image of the missing object, a caption describing the missing object, or an icon. The icon may be an image of the missing object which is overlaid on the output image (output cropped image or output updated image). The captions (or written descriptions) may be generated by a caption generator and any suitable technique may be used. A caption may describe more than one object, e.g. all objects omitted from one side of an input image, or a plurality of captions may be generated, one for each omitted object.

Outputting the representations may comprise instructions to display each representation adjacent to the cropped image. The cropped image and/or the updated image may be displayed in a main portion of the display, e.g. a central portion of the display. The representations may be displayed outside the main portion of the display, for example in edge portions or sub-portions of the display. Alternatively, the representations may be overlaid on the output image. Whether the instructions are to display adjacent to or overlaid on the image, the outputting of the representation may comprise instructions that the representations may be generally aligned with their location in the original input image.

Receiving a selection signal of at least one missing object may be done by receiving an input resulting from a user pressing on the representation for example if the display is touch sensitive. When a selection signal is received, an indication to the user of the selection may be output. For example, the selected image may be surrounded by a box or where a caption is used, a selection portion of the caption may be highlighted.

Generating an updated image may comprise creating an updated image which comprises the cropped image together with the selected at least one missing object. Generating the updated image may comprise using a retargeting algorithm. Alternatively, generating an updated image may comprise re-cropping the input image to obtain an updated cropped image comprising the selected at least one missing objects. For example, re-cropping the input image may obtain an updated cropped image which is centered on one of the selected at least one missing objects.

Cropping the input image may be done using a cropping module. Cropping may use an aesthetic aware AI algorithm, saliency based cropping, or a grid anchor approach. For example, cropping the input image may include cropping the image to center on one of the plurality of detected objects. The object on which to center the cropped image may be selected in different ways. For example, the method may further comprise ranking the plurality of detected objects and cropping the input image by centering on a highest ranked object. The ranking may be based on various factors including type of object, size of the object, and distance from the center of the original input image. Training, e.g. using an AI algorithm may also be used, for example to determine the ranking. The method may alternatively comprise training using historic selections of at least one missing object; predicting, following training, a user preference for an object in the plurality of detected objects; and cropping the input image by centering on the predicted object. In other words, the historic selection signal(s) of the missing objects to be added may be used as active learning labelled information which can be used in an artificial intelligence model to train a cropping algorithm to generate the cropped image and/or to generate the updated image when cropping is used.

Detecting a plurality of objects within the input image may be done using an object detection module. Detecting a plurality of objects within the input image may be done using a bounding box technique or pixel wise classification.

Identifying the dimensions of the display may be done before, after, or simultaneously with the detecting step. Identifying the dimensions of the display may comprise predicting the dimensions of the display based on historic user preferences. For example, user preferences may include the type of device, aspect ratio, and display dimensions. The aspect ratio may also depend on the preferred orientation of the user device, e.g. whether it is rolled/unrolled, folded/unfolded or rotated from portrait to landscape. The user preference data may be used as active learning labelled information which can be used in an artificial intelligence model to train the cropping algorithm. The method may thus comprise training using historic selection of a display; predicting, following training, dimensions of the display; and cropping the input image to match the predicted dimensions of the display.

The image processing method may be applied on a first electronic device to output a cropped image (and updated image) for a second electronic device which is connected to the first electronic device. For example, the method may comprise receiving the input image at a first device and identifying, using the first device, the dimensions of a display on a second device on which the input image is to be displayed. The second device may have a display having a different shape or orientation to a display on the first device. The other method steps may also be carried out on the first device. The input image may be displayed on the first device during processing.

Alternatively, the image processing method may be applied on a first electronic device to output a cropped image (and updated image) which is suitable for a display on the first electronic device, e.g. to follow a change to the orientation of the current device, e.g. rolling from landscape to portrait or vice versa.

According to another aspect of the invention, there is also provided an electronic device comprising: memory storing computer readable program code, and a processor which executes the stored computer readable program code to carry out the image processing method described above. For example, the electronic device may comprise an object detection module for detecting a plurality of objects within the input image. The electronic device may comprise a cropping module for cropping the input image and/or generating an updated image when cropping is used. The electronic device may comprise a retargeting module for generating the updated image when a retargeting algorithm is used. The electronic device may comprise a training module for training using historic selection signals of the missing objects and/or selection of device for display. The modules may enable the processor to process an image as described above.

According to another aspect of the invention, there is also provided a system comprising a first electronic device described above, and a second electronic device which is connected to the first electronic device and which has a display on which the cropped image and representation of the at least one missing object are displayed. In other words, the system may comprise a first device and a second device, wherein the first device comprises a processor which is configured to detect a plurality of objects within an input image; identify dimensions of a display on the second device on which the input image is to be displayed; crop the input image to obtain a cropped image which matches the identified dimensions, wherein the cropped image includes at least one of the plurality of detected objects; obtain a list of missing objects which are not visible in the cropped image and which were detected in the input image; output, to the second device, a representation of each missing object in the list of missing objects to be displayed together with the cropped image; receive, from the second user device, a selection signal of at least one missing object; generate an updated image which comprises the selected at least one missing object and which matches the identified dimensions; and output, to the second user device, the updated image to be displayed on the display. The second user device comprises a processor which is configured to display the representation of each missing object and the cropped image received from the first user device; obtain a selection signal of at least one missing object; send the selection signal to the first user device; and display the updated image (and optionally any representations of missing objects).

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques may also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, for example on a non-transitory data carrier. The code may be provided on a carrier such as a disk, a microprocessor, CD-ROM or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog (RTM) or VHDL (Very high speed integrated circuit Hardware Description Language). As the skilled person will appreciate, such code and/or data may be distributed between pluralities of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

FIG. 3*a* shows an exemplary set up of a system comprising a first user device 30 and a second user device 40. The user devices may be used by the same user or different users. The user devices may be any suitable electronic device, e.g. laptop, computer, mobile phone, smart phone, personal digital assistant, televisions, tablets, smartwatches. For example, as shown in this arrangement, the first user device 30 is a smart phone and the second user device 40 is a smart watch. The first and second user devices are in communication with each other, using any suitable communication protocol, e.g. Wi-Fi, Bluetooth. An image is displayed on the display screen 32 of the first user device 30. The system transfers the image from the first user device 30 to the second user device 40. As shown in FIG. 3*a*, the display screen 42 for the second user device 40 has different dimensions to that of the first user device 30 and thus adjustments need to be made to the image.

The image 34 on the first user device 30 is shown in landscape mode and the display screen 42 on the second user device 40 is a portrait mode. Furthermore, in this example, the screen is not rollable, i.e. the orientation of the image on the screen does not change as the device is rotated. Simply transferring the image 34 to the second user device 40 without any adjustment could be done by displaying the image on the second user device 40 as shown in FIG. 3*b*. However, referring to FIG. 3*b*, the image is too small and there is a lot of blank space on the display of the second user device 40. By contrast, in the arrangement shown in FIG. 3*a*, the transferred image fits the screen of the second user device 40, is a good size relative to the screen 42 of the second user device 40, and has the original high resolution. Furthermore, as explained in more detail below, the important objects which are omitted from the transferred image 44 are also displayed.

FIG. 3*c* illustrates the detailed arrangement of the display screen 42 of the example second user device 40. There is a central portion 50 of the display screen 42 which is the main portion of the display screen 42 and which displays a cropped image from the original image. The main portion 50 of the display on the second user device 40 may be termed the point of view (PoV) for the user. In this arrangement, the display screen 42 is circular and the main portion 50 is the largest quadrilateral shape which fits within and is concentric with the display screen 42. There are also four edge portions 52*a*, 52*b*, 52*c*, 52*d* arranged around the main portion 50 to cover the remaining portions of the display screen 42. These edge portions may be considered to be sub-portions and at least some of the edge portions may be used to display information relating to the missing content which has been cropped from the original image. In other words, the missing objects (or representations of the missing objects) may be placed adjacent to the point of view.

FIG. 4 illustrates different ways of displaying the missing contents. Referring to 4*a*, like FIG. 3*a*, the missing content is indicated by representations 46*a*, 46*b*, 46*c* which are positioned either side of the main portion of the display screen showing the cropped image 44. In this arrangement, the representations are images of the objects which have been cropped from the original image. For example, there is a first object image 46*a* of the bird which has been cropped out. Similarly, there is a second object image 46*b* of the mountain and a third object image 46*c* of the house. The representations are located within the edge portions and are generally aligned with their location within the original image, e.g. the bird representation is higher than the other two representations.

Referring to 4*b*, like 4*a*, the missing content is indicated by representations 48*a*, 48*b*, 48*c*. In this example, the representations are also images of the objects which have been cropped from the original image but they are overlaid as icons on the cropped image 44.

Referring to 4*c*, like 4*a*, an indication of the missing content is provided in the edge portions on either side of the cropped image 44. In this example, the indications are written descriptions 58*a*, 58*b* of the missing content, e.g. "A mountain range covered by snow and an eagle flying around it" or "A small red house with one door, no windows and a triangular red roof". The written descriptions (or captions) may be generated by a caption generator and any suitable technique may be used. Examples algorithms are described in "Meshed Memory Transformer for Image Captioning" by Comia et al and "Image Captioning with Object Detection and Localization" by Yang et al. The caption generation may use the whole cropped area as an input or just the regions extracted by the object detector as described below. In other words, the caption may describe a plurality of objects, e.g.

all the objects in a part of the image which has been cropped or each caption may describe a single object, for example as identified by the bounding boxes below. If the objects detected by the object detector are not compatible with the image captioning network, they may need to be redone. Normally, this will not be the case and the object detections will be compatible with the image captioning network.

FIG. 5 illustrates one method of user interaction with the representations of missing content which allow a user to personalize the cropped image. As shown in 5*a*, the user may select the first object image 46*a* and the third object image 46*c* (i.e. the representations of the bird and the house). The selection may be done by a user pressing on the object images for example if the display is touch sensitive. Feedback to the user regarding the selection may be provided, e.g. by the highlight boxes as shown in 5*a*. The object images may thus be considered to be icon buttons. These objects are then added to the cropped image to create an output image 54 which includes the person, bird and house. The spacings between and the arrangement relative to one another of the three included objects (person, bird and house) is different to the spacings and arrangement in the original image. The first and third object images are thus removed from the edge portion because the objects are now displayed in the main image. Any objects which are not selected for inclusion are displayed in the edge portion as before, for example, the second object image 46*b* is still visible in the same location to the right of the new output image 54.

FIG. 6 illustrates an alternative method of user interaction with the representations of missing content which allow a user to personalize the cropped image. As shown in 6*a*, the user may highlight a section 60*a* of the written description 58*a* and the highlighted section 60*a* only selects the description of the bird. The user may also highlight a section 60*b* of the written description 58*b* of the house. As in 6*b*, these selected objects are then added to the cropped image to create an output image 54 which includes the person, bird and house. The descriptions of the bird and house are thus removed from the respective edge portions but a modified description 58*c* which only describes the mountain range is retained in the edge portion.

FIG. 7 is a schematic block diagram of the components within at least one of the user devices, e.g. within the first user device. The user device comprises a processor 60 and a memory 68 which stores modules and data for use by the processor 60. For example, the memory 68 may store an object detection module 70, a cropping module 72, a retargeting module 74 and a training module 76 which enable the processor to modify an image as described above. The memory 68 may also store at least one image 80. A plurality of images may be stored and thus the stored image 80 is merely indicative. Any or all of the original image, the output image, the images of the missing information and the updated output image may be stored in memory.

The processor 60 controls various processing operations performed by the user device and may comprise processing logic to process data (e.g. the images and user instructions) and generate output images in response to the processing. The processor 60 may comprise one or more of: a microprocessor, a microcontroller, and an integrated circuit. The memory 68 may be any suitable form of memory, including volatile memory, such as random access memory (RAM), for use as temporary memory, and/or non-volatile memory such as Flash, read only memory (ROM), or electrically erasable programmable ROM (EEPROM), for storing data, programs, or instructions, for example.

The user device may also comprise a user interface 64, a display 62 and a communications module 66. The user interface 64 may be any suitable interface which enables a user to provide inputs to the user device, e.g. keyboard, mouse or a touch sensitive display screen. The display 62 may comprise any suitable display screen, e.g. LCD, LED which may also be touch sensitive to allow user input. As shown in FIG. 3*a*, the user device may communicate with other user devices to transfer images and this may be enabled via the communications module 66 using any suitable communication, e.g. wireless communication, hypertext transfer protocol (HTTP), message queuing telemetry transport (MQTT), a wireless mobile telecommunication protocol, radio frequency communication (RFID), near field communication (NFC), ZigBee, Thread, Bluetooth, Bluetooth LE, IPv6 over Low Power Wireless Standard (6LoW-PAN), Constrained Application Protocol (CoAP) or a wired communication.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

FIGS. 8*a* and 8*b* together form a flowchart illustrating the steps of the method which may be implemented in the system of FIG. 3*a* and by the device shown in FIG. 7. The outputs at each step of the method are shown in FIG. 9.

An original image is input in a first step S800. The input image may be an image 32 such as the one shown in 9*a* of FIG. 9. The next step is to detect the objects within the input image (step S802). The object detection may be done using the object detection module 70 of FIG. 7 and may use any known technique, including those used in the prior art. An example of the results of the object detection are shown in 9*b* of FIG. 9. The object detection may be done using a bounding box and as shown, a box may be drawn around each object which compose the current scene in the input image, e.g. person, mountain, house, bird etc. Alternatively, pixel wise classification or other object detection methods may be used. Examples of suitable object detection algorithms include "Yolov3: An Incremental Improvement" by Redmon et al, "YOLACT++ Better Real-time Instance Segmentation" by Bolya et al and "Mask R-CNN" by He et al.

The next step is an optional step and ranks the detected objects in order of importance (step S804). The ranking may take into account any suitable factor including one or more of the kind of object, the size of the object (i.e. how large it is), its distance from the center of the original image (i.e. how far from the center it is found).

As illustrated in FIG. 8*a*, while the input image is being processed, the dimensions of the display on which the image is to be displayed are also determined (step S805). This step can be done before the image is processed, after the processing of the image or simultaneously with the image processing. In the example above, the image is to be displayed on a different user device with a smaller display but as explained below, the image may be transferred to a device with a larger screen but different form factor (e.g. portrait to landscape). Alternatively, the image may also be processed following a change to the orientation of the current device, e.g. rolling from landscape to portrait or vice versa.

Following object detection, and optional ranking of the objects, the original input image is then cropped (step S806) to fit the intended display. The cropping may be done using the cropping module 72 of FIG. 7 and may use any known technique, for example aesthetic aware AI algorithms (see for example "A2-RL:Aesthetics Aware Reinforcement Learning for Image Cropping" by Li et al or "An End-to-End Neural Network for Image Cropping by Learning Composition from Aesthetic Photos" by Lu et al both published in The Open Access CVF), saliency based cropping, a grid anchor approach (see for example "Reliable and Efficient Image Cropping: A Grid Anchor Based Approach" by Zeng et al published in The Open Access CVF) or state of the art cropping using the results of the object detection and the ranking. An example cropped image 44 is shown in 9*c* of FIG. 9.

The next step (S808) is then to determine which of the objects which were detected in step S804 are not present in the cropped image, i.e. have been extracted from the image. This determination may be done using any suitable technique, e.g. repeating the object detection of step S802 and comparing a list of objects detected in the cropped image with a list of objects detected in the original image. The objects which are not shown in the cropped image may be considered to be missing and may optionally be ranked in importance, e.g. using the results of the optional step S804.

Once the missing objects have been identified (and if required ranked), the next step (step S810) is to output a representation of these missing objects to be displayed on the second user device with the cropped image. An example of the display on a second user device is shown in 9*d* of FIG. 9 and includes the cropped image 44 between image representations of the missing objects. There is a first object image 46*a* of a bird, a second object image 46*b* of a mountain on one side of the cropped image 44 and a third object image 46*c* of a house on the other side of the cropped image 44. It will be appreciated that this is just one way of outputting the information about the missing objects and any of the alternatives described above may be used.

The user may then select one or more of the displayed missing objects and this selection signal is received by the user device (step S812). An exemplary indication of the selection by the user is shown in 9*e* of Figure e and the user may select two of the three missing objects to be included. These selected objects are represented by the object images 46*a*, 46*c*. The user device is then configured to generate an updated image 54 which is based on the cropped image 44 together with the selected missing objects (step S814). An example of the updated image 54 is shown in 9*f* of FIG. 9.

The updated image 54 may be generated by using any appropriate technique, for example an aesthetic aware retargeting algorithm which may be within the retargeting module 74 of FIG. 7. Examples of suitable algorithms are described in "Image Retargetability" by Tang et al published in IEEE transactions on Multimedia 2019, "Cycle-IR: Deep Cyclic Image Retargeting" by Tan et al, "DeepIR: A Deep Semantics Driven Framework for Image Retargeting" by Lin et al or "Deep Video Inpainting" by Kim et al. Alternatively, cropping may be used again as explained with reference to FIG. 12*a*.

Returning to FIG. 8*b*, the user device is configured to determine which objects are still missing from the updated image (step S816). This may be done, for example, by comparing a list of selected objects with a list of objects provided alongside the previous cropped image. The updated image is then transferred (to the second user device or the revised first user device) together with the representations of any other missing objects (step S818). For example, as shown in 9*f* of FIG. 9, the updated image 54 now includes the previously omitted objects: the bird and the house, but the mountain is still omitted and thus a representation of this object is displayed as an object image 46*b*.

The method can be repeated to allow a user to select one or more additional missing objects to be included in a new updated image. Accordingly, the next step may be to receive another selection signal of the new at least one missing object (step S820) and if this is received, the steps of generating an updated image through to outputting the updated image are repeated (steps S814 to S818). Alternatively, the process will end if there is no further selection signal (step S822).

In the example of FIG. 3*a* described above, the image is transferred from a first user device 30 to a second separate user device 40. However, it will be appreciated that the method described above may also be used to generate an updated image when rotating a user device between landscape or portrait mode and vice versa. For example, FIG. 10*a* shows the first user device 30 displaying an image 34 in a landscape mode. As indicated by the arrow, the user then rotates the user device 30 through 90 degrees. Using the method described above, a cropped image 44 obtained from the original landscape image 34 is displayed together with the representations 46*a*, 46*b*, 46*c* of the missing objects as described above. A user can then select one or more of the missing objects to be added into an updated image as described above.

FIGS. 10*b* and 10*c* illustrate alternative ways the same image could be shown on the rotated screen without using the method described above. It will be appreciated that there are advantages of using the cropped image (and updated image when created) as per the method described above. These images fit the rotated screen and include the import objects. Furthermore, the original high resolution is maintained and power may be saved by not rotating the image. By contrast, in FIG. 10*b*, the transferred image does not fit the screen and in FIG. 10*c*, the image is not easily viewed by the user.

The example described in detail above, also focused on transferring an image from landscape to portrait mode but it will be appreciated that the method may also be applied when transferring from portrait mode to landscape mode. For example, in FIG. 11*a*, a user transfers an image 134 from a first user device 130 in the form of a smart watch to a second user device 140 in the form of a widescreen TV. Following the method described above, the input image 134 is cropped around a main object, which again is the person in the image. The cropped image includes the house and the mountain so this time, the missing objects are identified as the bird and the sun and these are displayed above the cropped image 144 as representations in the form of first object image 146*a* and second object image 146*b*. The user may select to include these features if they wish as described above. For comparison, FIG. 11b illustrated how the transferred image may be displayed on the screen if the method described above is not used. As shown it does not fit the screen and the image is not easily viewed by the user.

FIG. 12a illustrates another alternative arrangement. FIG. 12a is a continuation of the method shown in FIG. 8a. In this arrangement, once the user has selected missing objects, a cropping algorithm may be used to generate an updated image which is centered on the selected missing object. Use of a cropping algorithm may necessitate multiple steps to gradually move from the crop from one position to another. For example, as shown in FIG. 12b, the user has selected the first object image 46a corresponding to the missing bird. The bounding box around the bird may be considered to be the user specific ground truth and an updated image 154 is generated. The updated image 154 moves from a first crop in which the cropping is centered around the main object (i.e. person) and the new crop is to be centered around a different main object (i.e. bird).

Once the updated image 154 is generated, there is then a determination as to which objects are missing from the original image in the updated image 154 (step S1216). This determination may be done using any suitable technique, for example by comparing a list of objects in the original image with a list of objects in the updated image 154. The updated image is then transferred or output together with the representations of the missing objects (step S1218). For example, as shown in FIG. 12c, the updated image 154 now omits the previously included object of the person and the house and mountain are still omitted. Thus a representation of each missing object is displayed as an object image 46b, 46c, 46d. In this example, the object images are displayed in an edge portion which is closest to the location of the missing object in the original image.

The method can be repeated to allow a user to select one or more additional missing objects to be the focus of a new updated image. Accordingly, the next step may be to receive another selection signal of the new missing objects (step S1220) and if this is received, the steps of generating an updated image through to outputting the updated image are repeated (steps S1214 to S1218). Alternatively, the process will end if there is no further selection signal (step S1222). It will also be appreciated that a combination of the FIGS. 8b and 12a could be implemented according to user preferences. For example, the first selection signal may refocus on a different object and the second selection signal may be used to include additional missing objects as described in FIG. 8b.

The selection signal(s) of the missing information to be added may be used as active learning labelled information which can be used in an artificial intelligence model to train a cropping algorithm. The training may be done on the user device, e.g. in the training module 76 shown in FIG. 7 or in a remote location away from the user device (e.g. in the cloud). The captured information may be used in a federated learning framework to improve the global model, for example by learning user preferences and creating initial cropped images based on these preferences.

The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

Visual understanding is a technique for recognizing and processing things as human vision does, and includes, e.g., object recognition, object tracking, image retrieval, human recognition, scene recognition, 3D reconstruction/localization, or image enhancement.

The methods described above may be used in different scenarios, e.g. to transfer images between two devices have different display sizes or to share images between users. In the latter example, the image may be shared with cropped information so that the resolution is lower. However, the transferred image may be updated either to include additional features as in FIG. 8b or to refocus the updated image around different content as in FIG. 12a.

FIG. 13 illustrates an example image transfer system with two devices of different size of display screen. For example, if the display on the second user device is ⅛ of the size of the first user device from which the image is being transferred, the first transfer of the cropped image transfers an image which is ⅛ of the original size. When a user asks for missing content to be included, the updated image is still ⅛ of the original size but there have been two transfers and thus a total of ⅔ of the original size has effectively been transferred. Similarly, when a user asks for the updated image which is ⅛ of the original size to be refocused around a different object, the updated image is also ⅛ of the size of the original image and there have been two similarly sized transfers.

The training process may be used to predict the preferences of the user of the device from which the image is being transferred and also the preferences of the user of the device to which the image is being transferred. For example, user preferences may include the type of device, aspect ratio and display dimensions. The aspect ratio may also depend on the preferred orientation of the user device, e.g. whether it is rolled/unrolled, folded/unfolded or rotated from portrait to landscape. In addition to user preferences relating to the device, there may be user preferences in relation to objects which are preferred in cropped images. Merely as an illustration, using the example above, a first user may prefer an image cropped around a person and a different user may prefer an image cropped around a bird. These preferences may be learned as in the example of FIG. 12a. Once these preferences have been learnt, a new set of cropped pictures may be automatically produced based on the preferences. In other words, cropped images of the preferred aspect ratio and contained preferred objects will be automatically generated.

This automatic generation may be useful when preparing a full gallery of images. Typically such galleries have reduced size compared to the original image and focusing on areas of interest is necessary. As another example, when doing photo album animations, normally images containing regions of interest (face, human) are used to generate the animation. Additionally, a composition effect may normally be added by cropping regions of interest and showing the regions of interest in full screen. However, this cropping may lose the context of the original image, for example whether a person was in the mountains or next to a motorbike. Perhaps the motorbike was the person's first motorbike or the mountain was a memorable scenario. The system may be trained to learn that context is important when generating a composition effect and thus the context may be included in the cropped image.

Other examples of uses of the processes described above include split screen content viewer or multi window systems. Again, it may not be possible to display the full original image in these systems and the use of the system and process above allows user preferences to be taken into account.

Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

Although a few preferred embodiments of the present invention have been shown and described, it will be appreciated by those skilled in the art that various changes and modifications might be made without departing from the scope of the invention, as defined in the appended claims.

The invention claimed is:

1. An image processing method comprising:
   receiving an input image;
   detecting a plurality of objects within the input image;
   identifying dimensions of a display on which the input image is to be displayed;
   cropping the input image to obtain a cropped image which matches the identified dimensions, wherein the cropped image is a portion of the input image and includes at least one of the plurality of detected objects;
   obtaining a list of missing objects which are not visible in the cropped image and which were detected in the input image;
   obtaining a representation of at least one missing object in the list of missing objects to be displayed together with the cropped image, wherein the representation of an object is at least one of a re-sized image of an object, a caption describing the object, or an icon;
   generating an updated image comprising the representation of the at least one missing object and the cropped image; and
   outputting the updated image to be displayed on the display.

2. The image processing method of claim 1, wherein the updated image includes each representation at a location on the display which aligns with their location in the original input image.

3. The image processing method of claim 1, further comprising:
   receiving a selection signal of selecting at least one missing object.

4. The image processing method of claim 3, wherein the updated image comprises the cropped image and the selected at least one missing object.

5. The image processing method of claim 3, wherein the generating of the updated image comprises re-cropping the input image to obtain an updated cropped image comprising the selected at least one missing object.

6. The image processing method of claim 5, wherein the updated cropped image is centered on one of the selected at least one missing object.

7. The image processing method of claim 1, further comprising:
   receiving the input image at a first device; and
   identifying, using the first device, the dimensions of a display on a second device on which the input image is to be displayed.

8. The image processing method of claim 1, wherein the cropped image is centered on one of the plurality of detected objects.

9. The image processing method of claim 8, further comprising:
   ranking the plurality of detected objects and
   cropping the input image by centering on a highest ranked object.

10. The image processing method of claim 8, further comprising:
    training using historic selection signal of at least one missing object;
    predicting, following training, a preference for an object in the plurality of detected objects; and
    cropping the input image by centering on the predicted object with the highest preference.

11. The image processing method of claim 1, wherein the identifying of the dimensions of the display comprises predicting the dimensions of the display based on historic preferences.

12. A non-transitory computer readable medium having computer readable program code which when running on a computer causes the computer to carry out the image processing method comprising:
    receiving an input image;
    detecting a plurality of objects within the input image;
    identifying dimensions of a display on which the input image is to be displayed;
    cropping the input image to obtain a cropped image which matches the identified dimensions, wherein the cropped image is a portion of the input image and includes at least one of the plurality of detected objects;
    obtaining a list of missing objects which are not visible in the cropped image and which were detected in the input image;
    obtaining a representation of at least one missing object in the list of missing objects to be displayed together with the cropped image, wherein the representation of an object is at least one of a re-sized image of an object, a caption describing the object, or an icon;
    generating an updated image comprising the representation of the at least one missing object and the cropped image; and outputting the updated image to be displayed on the display.

13. An electronic device comprising:
memory storing computer readable program code; and
a processor which executes the stored computer readable program code to carry out the image processing method comprising:
  receiving an input image;
  detecting a plurality of objects within the input image;
  identifying dimensions of a display on which the input image is to be displayed;
  cropping the input image to obtain a cropped image which matches the identified dimensions, wherein the cropped image is a portion of the input image and includes at least one of the plurality of detected objects;
  obtaining a list of missing objects which are not visible in the cropped image and which were detected in the input image;
  obtaining a representation of at least one missing object in the list of missing objects to be displayed together with the cropped image, wherein the representation of an object is at least one of a re-sized image of an object, a caption describing the object, or an icon;
  generating an updated image comprising the representation of the at least one missing object and the cropped image; and
  outputting the updated image to be displayed on the display.

14. A system comprising:

the electronic device of claim 13, and a second electronic device having a display on which the cropped image and representation of the at least one missing object are displayed.

* * * * *